Dec. 14, 1943.    E. B. THOMPSON    2,336,817
HOIST
Filed Oct. 30, 1941

Inventor
Elmer B. Thompson
by Owing & Hague
Attys

Patented Dec. 14, 1943

2,336,817

UNITED STATES PATENT OFFICE 2,336,817

HOIST

Elmer B. Thompson, Des Moines, Iowa, assignor to Globe Hoist Company, Des Moines, Iowa, a corporation of Iowa Application October 30, 1941, Serial No. 417,143

1 Claim. (Cl. 137—68)

My invention relates to that class of automobile hoists known as semi-hydraulic hoists and having an oil storage tank at the lower end of the cylinder, and an oil control pipe for conducting and controlling the speed of travel of oil from and to the lower portion of the oil storage tank, and having means for forcing air under pressure into the oil supply tank for raising the hoist.

In hoists of this class it sometimes happens that the oil supply becomes too low. When this occurs, and when the compressed air has forced the oil out to a point below the lower end of the oil control pipe, then the air rushes violently and quickly through the oil control pipe and rapidly raises the hoist with sometimes disastrous effects.

The object of my invention is to provide means of simple, durable and inexpensive construction for automatically closing the lower end of the oil control pipe before the oil level reaches said opening, to thereby prevent the flow of compressed air through the oil control pipe.

In the accompanying drawing—

Figures 1, 2, 3:
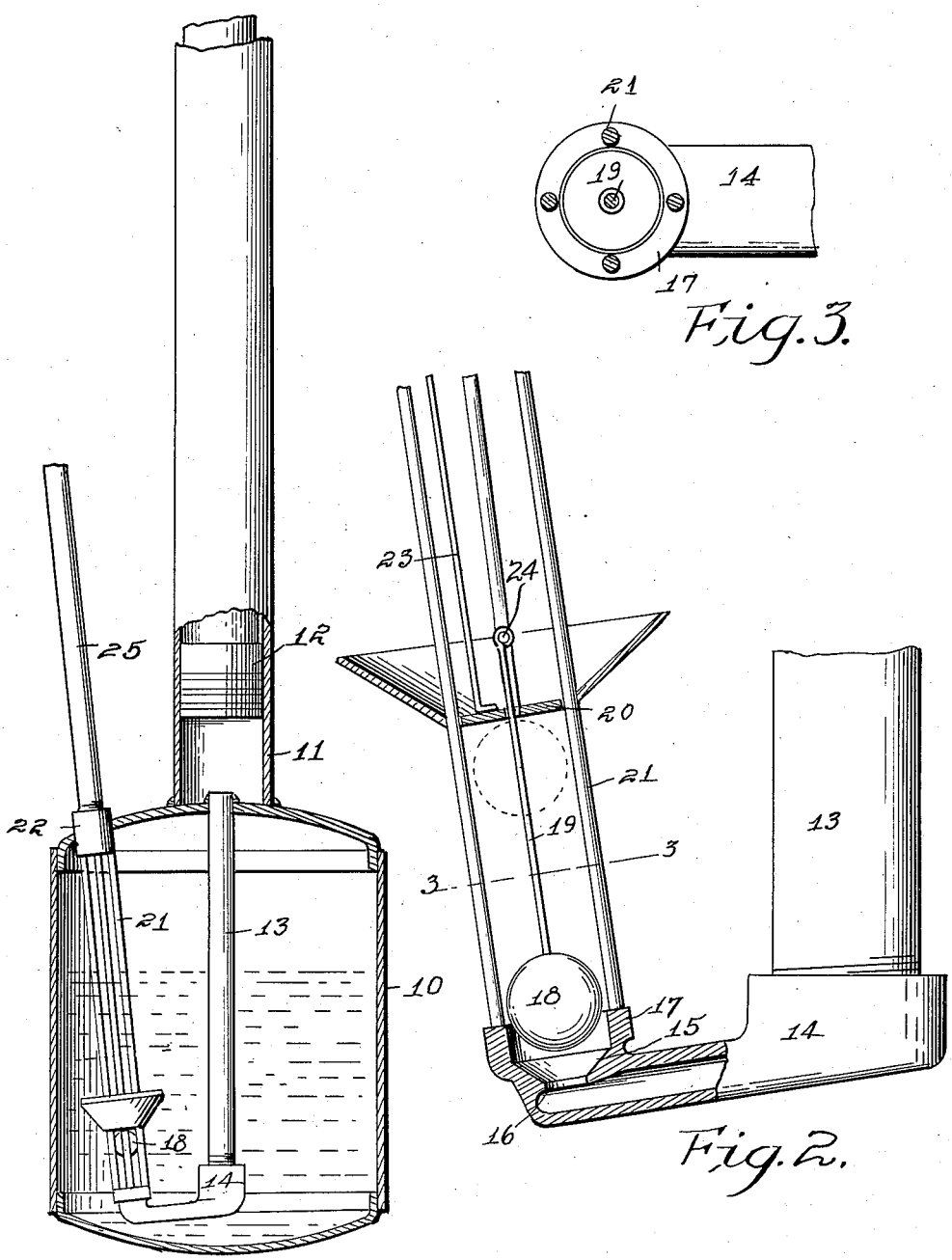
Figure 1 shows a vertical central sectional view, partly side elevation, of a semi-hydraulic hoist having my improvement applied thereto.
Figure 2 shows an enlarged detail view, partly in section, of the lower portion of the oil control pipe and float valve.
Figure 3 shows a sectional view on the line 3—3 of Figure 2.

The oil supply tank is indicated by the reference numeral 10. At its top is the hoist cylinder 11 having the hoist piston 12 therein.

The pipe 13 conducts oil to and from the lower end of the cylinder 11 and the lower portion of the oil supply tank 10.

At the lower end of the pipe 13 is a fitting 15 secured to the pipe 13 extended laterally and having an upwardly extended valve seat 15 and an oil control opening 16. Above the valve seat is an upwardly extended cylindrical wall 17.

A float ball 18 having a diameter to loosely fit the interior of the cylindrical wall 17, is secured to a guide rod 19 which is slidingly mounted in a supporting member 20 which is slidingly mounted on upright rods 21, which also support the fitting 15. These rods are attached to the wall 17 and to a plug 22 at the top of the oil supply tank. Extended through this plug is a rod 23 attached to the supporting member 20 whereby it may be raised or lowered, and the guide rod 19 has a ring 24 at its upper end above the member 20 and whereby it also may be raised and lowered with the member 20.

A pipe 25 is extended through the plug 22 for conducting compressed air to and from the oil supply tank.

In practical use, and when there is a proper amount of oil in the tank 10, the ball float remains above the cylindrical wall 17 and does not interfere with the flow of oil through the oil control opening 16. When, however, there is an insufficient amount of oil in the oil supply tank, then as the oil is being forced by the compressed air out through the oil control opening, the float ball will move downwardly with the oil level until it enters the cylindrical wall 17 and is finally forced slowly against the valve seat 15 by the compressed air.

I have demonstrated by tests that when the cylindrical wall 17 is omitted and when the level of the oil reaches below the valve seat, the air pressure upon the float ball forces it rapidly against the valve seat and it rebounds therefrom several times before coming to rest, resulting in rapid raising and lowering of the hoist, with sometimes disastrous effects.

In my improvement I have overcome this objection by providing the cylindrical wall 17 above the valve seat. The float ball enters this wall before the oil level reaches the valve seat, and prevents further flow of oil, except in small quantities, and the float ball is thereby slowly moved against the valve seat by the compressed air and cannot rebound because to do so it would have to pull a volume of oil equal to the diameter of the cylindrical wall 17 through the small control orifice 16. Further the pressure of the air in the tank 10 acts on an area of the float 18 which is greater than the area of the float at the orifice 16 acted on by the pressure of the oil in the cylinder 11. As a result by virtue of the overall pressure tending to hold the valve 18 being greater than the pressure tending to lift the valve from the seat 15, the valve is firmly held against the seat 15 to stop any flow of oil or air therethrough. By this means the compressed air within the oil control tank is prevented from entering the control opening, and the speed of travel of the hoist is controlled by the speed with which the oil may pass through the control opening.

I claim as my invention:

A valve structure for controlling the flow of fluid under pressure from one container to a second container, passage means connecting said two containers, an upright cylinder in said one container connected at its lower end with said passage means, said cylinder being open at its upper end and having a valve seat adjacent said lower end with an orifice of an area less than the area of the opening at said upper end, a float piston movable into and out of said cylinder at said upper end, means spaced upwardly from said valve seat for guiding the movement of said piston and means for applying an air pressure on the fluid in said one container to force the fluid therefrom through said cylinder and passage means into said second container, said piston on lowering of the fluid level in said one container entering said cylinder, with said air pressure acting on said piston to force the fluid from said cylinder, and said piston into an orifice closing position against said seat.

ELMER B. THOMPSON.